United States Patent [19]
Jarrett et al.

[11] Patent Number: 4,896,730
[45] Date of Patent: Jan. 30, 1990

[54] APPARATUS FOR CULTIVATING RICE AND OTHER CROPS

[75] Inventors: James D. Jarrett; Lynn S. Murray, both of Williams, Calif.

[73] Assignee: Pure-Harvest Corporation, Napa, Calif.

[21] Appl. No.: 295,352

[22] Filed: Jan. 10, 1989

Related U.S. Application Data

[63] Continuation-in-part of Ser. No. 176,059, Mar. 31, 1988, abandoned.

[51] Int. Cl.$^4$ .................. A01B 49/02; A01B 23/02; A01B 23/04
[52] U.S. Cl. ..................... 172/40; 172/643; 172/96; 172/707; 172/328; 172/711; 172/95; 172/311
[58] Field of Search ............... 172/622, 54.5, 40, 643, 172/178, 198, 482, 497, 634, 635, 659, 660, 142, 707, 708, 710, 711

[56] References Cited

U.S. PATENT DOCUMENTS

| | | | |
|---|---|---|---|
| 484,815 | 10/1892 | Perkins | 172/54.5 |
| 970,921 | 9/1910 | Hecht | 172/622 X |
| 1,091,831 | 3/1914 | Gibbons | 172/711 |
| 1,570,782 | 1/1926 | Scheuing | 172/707 X |
| 1,687,422 | 10/1928 | Bensien | 172/710 X |
| 1,930,850 | 10/1933 | Colca | 172/142 X |
| 2,559,002 | 7/1951 | Brock | 172/622 X |
| 2,730,854 | 1/1956 | Bordigon . | |
| 2,737,005 | 3/1956 | Archer . | |
| 2,935,140 | 5/1960 | Talbert | 172/118 |
| 3,016,958 | 1/1962 | Knapp et al. . | |
| 3,043,377 | 7/1962 | Urben . | |
| 3,049,184 | 8/1962 | Lohrman | 172/707 |
| 3,232,357 | 2/1966 | Van Der Lely et al. . | |
| 3,356,162 | 12/1967 | Van Der Lely . | |
| 3,390,727 | 7/1968 | Weaver | 172/413 |
| 3,439,751 | 4/1969 | Kasten . | |
| 3,710,872 | 1/1973 | Kovar | 172/707 |
| 3,765,159 | 10/1973 | Neff . | |
| 3,774,694 | 11/1973 | Gates | 172/643 |
| 3,976,145 | 8/1976 | Blair | 172/198 |
| 4,146,096 | 3/1979 | Rocker . | |
| 4,220,211 | 9/1980 | Hake | 172/618 |
| 4,472,930 | 9/1984 | Smith . | |
| 4,676,321 | 6/1987 | Friggstad . | |
| 4,685,524 | 8/1987 | Williamson | 172/643 |
| 4,689,941 | 9/1987 | Doering . | |

OTHER PUBLICATIONS

Farm Show, vol. 9, No. 6, p. 2 Article Concerning "Superharrow" of Summers Mfg. Co., 11/1985.
Wheel Mounted Danish Tine Harrows–advertising brochure of McConnell Mfg. Co. of Prattsburg, N.Y., 1/1982.
Trail–r–harro Maliher–advertising brochure of Noble, In., 1/1979.

*Primary Examiner*—Richard J. Johnson
*Attorney, Agent, or Firm*—Robbins & Laramie

[57] ABSTRACT

An apparatus which can cultivate rice and other crops, comprising a frame having a plurality of transversely extending spaced cultivator bars, each of the bars having a plurality of spaced elongated soil working members extending generally vertically downward of said bars. The apparatus is pulled over the planted area to remove the weed plants.

33 Claims, 13 Drawing Sheets

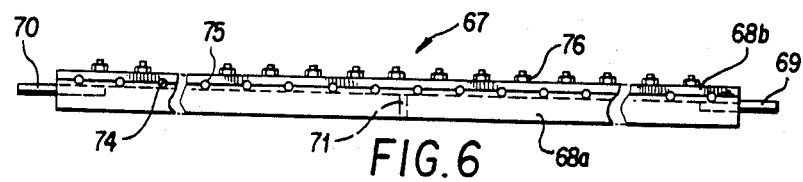
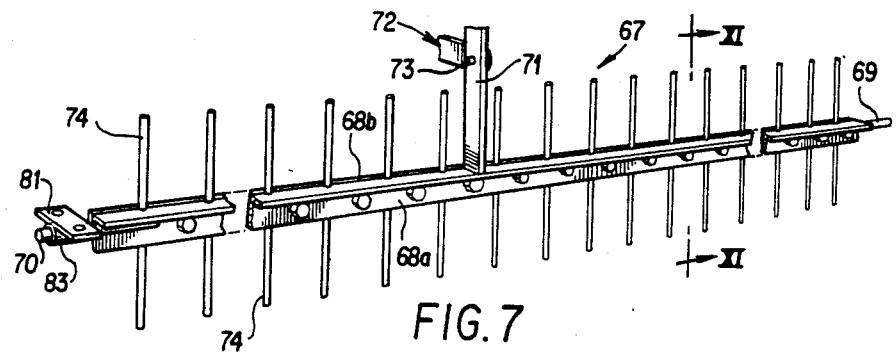
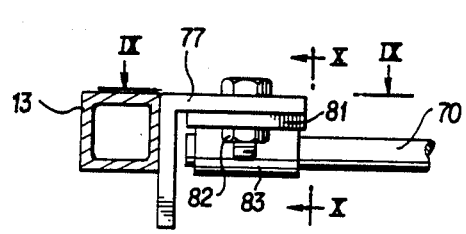 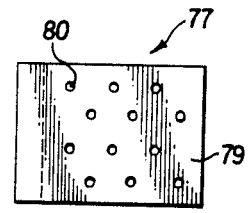
FIG. 8  FIG. 9
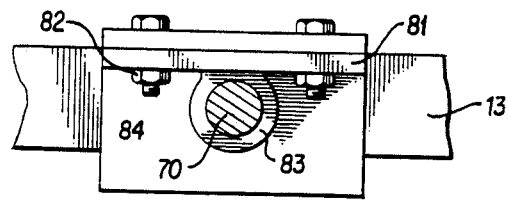
FIG. 10

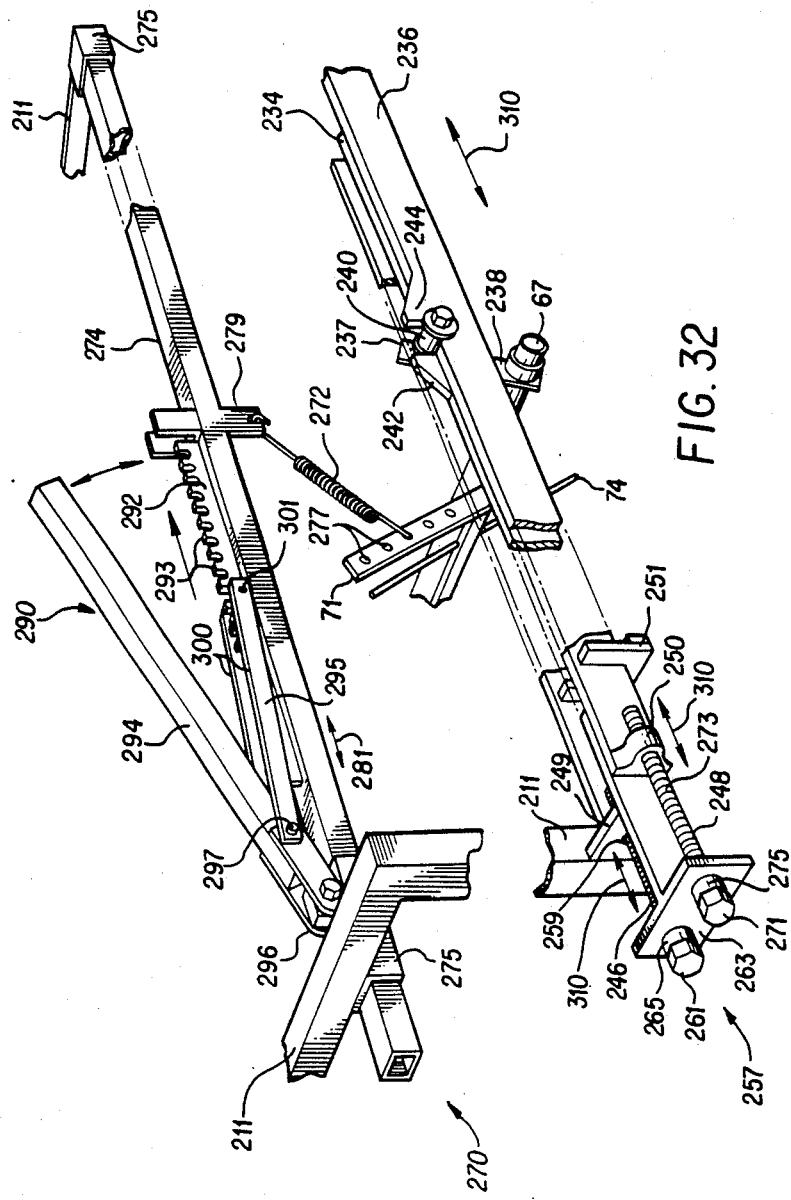

APPARATUS FOR CULTIVATING RICE AND OTHER CROPS

CROSS-REFERENCE TO RELATED APPLICATION

The present application is a continuation-in-part application of application Ser. No. 176,059, filed on Mar. 31, 1988 now abandoned.

BACKGROUND OF THE INVENTION

The invention relates to soil cultivation apparatus for cultivating rice and other crops, and to methods which allow the apparatus to cultivate moist or dry earth to remove weeds from within a growing stand of rice. The apparatus of the invention can be used with any crop which is planted three-fourths of an inch or deeper into the soil.

Soil cultivating apparatuses are well known in the art. Such apparatuses are used for seedbed preparation before planting, or to remove weeds from between rows of actively growing crops. For example, a rotary harrow having a plurality of spaced soil working tines is disclosed in U.S. Pat. No. 4,171,725. An adjustable tooth harrow is disclosed in U.S. Pat. No. 2,730,854 which has a series of drag bars, each with teeth which can be adjusted either forward or backward. Spring tooth harrows are disclosed in U.S. Pat. Nos. 3,049,184 and 3,016,958. These references describe cultivating implements with spring or flexible teeth and a tooth mounting means providing a frictional snubbing action to reduce tooth breakage.

Currently, there are two methods of producing paddy rice in the United States. The conventional method in California is to aerially "broadcast" the rice seed into pre-cultivated and pre-flooded paddies that remain flooded for the entire growing season, except for brief periods required for usage of certain pesticides. Between April and early June, the paddy seedbed is prepared by chisel plowing and discing. The ground is leveled with the use of a triplane. The goal is to produce a level paddy with a soil clod size of about two inches in diameter. Nitrogen fertilizer in amounts of 100 units or more per acre is applied to the paddy, either aerially or with equipment pulled by tractors, and incorporated into the soil. A starter fertilizer containing phosphorus and trace elements is also often used. Fertilizer amounts are usually based on the results of soil analysis. Seed is usually treated with a fungicide or pelletized (containing micronutrients). 100 to 200 pounds of seed is aerially broadcast over the flooded paddy. The seed germinates, becomes rooted in the soil, and the plants grow above the water level in the paddy. Herbicides are applied to the fields to control weeds. To control grass weeds, the herbicide Ordram ® may be aerially broadcast before flooding and incorporated into the upper one to two inches of soil. This chemical may also be combined with the irrigation water as it is added to the paddy, or it may be aerially applied after flooding. The herbicides Ordram ® and Bolero ® are used to control grass weeds. Broadleaf weeds may be controlled with the use of Basagram ® or MCPA (2-methyl-4-chlorophenoxyacetic acid). Their use requires the paddy to be drained, and these chemicals are then sprayed or broadcast onto the field. Insecticides are used to control insect pests that damage the rice plants. To control rice weevils, Furadan ® is broadcast and incorporated into the soil along the edges of the field and on the levees prior to flooding. After flooding, Furadan ® is applied by draining the paddy and broadcasting the chemical but without incorporation into the field. Algae growth and tadpole shrimp are controlled by broadcasting copper sulfate into the flooded paddy. Leaf miners, rice midge and tadpole shrimp may be controlled by broadcasting methyl or ethyl parathion into the flooded paddy.

The rice paddy is normally flooded to a water level of four to sic inches in depth prior to planting. This water level is maintained throughout the growing season, except when the paddy is derained to allow any required herbicide or pesticide treatments, or the water level is increased to protect pollen from cold weather during the "boot" stage of growth.

The second method of growing paddy rice, predominately used in the southern United States, involves use of the same seedbed preparation. A conventional grain drill is used to plant 60–80 pounds of seed into the upper half-inch of dry soil. The rice paddy is then shallowly flooded with water. After germination and emergence of the seedlings, soil moisture is retained by occasional irrigation flushing until permanent flooding is conducted, after the fourth leaf development of the seedlings. Herbicide and pesticide treatments are the same as in the first method. Both methods can be modified for use in organic farming by using natural fertilizers and by deeper flooding (8–12 inches of water) to aid in weed control. However, a reduced yield usually results with organic modifications.

Research on rice sowing depth and time between irrigation and sowing has been reported in Hanviriyapant et al., *Field Crops Res.* 16, 273 (1987). Rice was drilled 6–8 cm deep into moist soil in northwest Australia. Weeds, which germinated following the single irrigation prior to planting, were controlled by cultivation just before planting. The cultivation of rice once the stand is established creates special problems, such as removing weeds without damaging or uprooting the rice plants.

Rice has been grown previously in a semi-moist (muddy) environment. However, such an environment allows the rapid and profuse growth of weeds, which must then be removed before or during the early growth stage or the yield of rice will be seriously reduced. Insects and other pests also damage rice plants, and in normal practice, herbicides and pesticides are used to eliminate unwanted weeds and insects. However, it can be appreciated that such use of herbicides and pesticides undesirably affects water quality and wildlife, and increases overall crop production costs. In some areas, water from rice farms treated with pesticides is discharged into other bodies of water, which is also highly undesirable. Legislation has been enacted in some parts of the United States to reduce or eliminate the use of pesticides and to control discharges of water from areas so treated.

A need exists for a mechanical means for weed control during rice crop production and a method for growing rice that will result in satisfactory rice yields and yet eliminate or reduce the use of environmentally hazardous herbicides and pesticides. This can be accomplished by using an other-than-normal planting depth and by changing the schedule of irrigation, which results in differences in plant size and vigor between rice and weeds. It also controls the environment for the insects and other pests, interrupting their life cycles. The apparatus of the invention successfully cultivates the rice on the basis of these differences. The process of growing rice of the invention provides conditions under which weeds and rice pests are controlled in the field. An increased tillering of the rice plants also occurs, holding per-acre yields to the same levels previously obtained by existing (conventional) methods.

SUMMARY OF THE INVENTION

This invention provides an apparatus for cultivating and producing rice and other crops without the use of pesticides. The invention further provides a mechanical apparatus for taking advantage of differences in size and vigor between crop seedlings and weeds, produced by the process part of the present invention, to cultivate and remove the weeds without the use of undesirable herbicides. The soil moisture is managed in such a manner as to reduce weed growth relative to rice growth, and to not develop the environmental conditions necessary for rice insects or other pests.

The apparatus comprises a frame having a plurality of transversely extending spaced cultivator bars, each of the bars having a plurality of spaced elongated soil working tine members extending generally vertically downward of said bars. The frame is adjusted relative to the wheels of the apparatus, and precisely controls the depth of the tines from three inches into the soil to one-half inch above the soil. The distance between the tines along each cultivator bar ranges from two inches to sixteen inches, with four inches preferred. If larger distances are utilized, the number of bars must be increased. An overall tine spacing on the soil can be precisely adjusted from one-half inch to two inches, preferably one-half inch to one inch, by use of multiple bars and by adjustment of each individual cultivator bar's position relative to the frame and each other. As the apparatus is moved over the soil, the tines vibrate in all directions (360°) and completely cultivates the entire surface of the soil. A shock-absorbing material can be placed next to, or around the tine to slightly dampen the vibration and to increase the life of the tine.

BRIEF DESCRIPTION OF THE DRAWINGS

FIG. 5 is a perspective view of the apparatus of FIGS. 2 and 3 showing a connecting means for raising and lowering the top bar and coupling the apparatus to a tractor or the like;

FIG. 6 is a top plan view of one of the cultivator bars of the apparatus of FIGS. 1 to 5 removed therefrom for convenience of illustration;

FIG. 7 is a perspective view of the bar of FIG. 6;

FIG. 8 is a sectional view taken along lines VIII—VIII of FIG. 2;

FIGS. 9 and 10 are views taken along lines IX—IX and X—X of FIG. 8, respectively;

FIG. 29b is a fragmentary side view of the tine holder employed in the embodiment illustrated in FIG. 29a.

FIG. 32 is a fragmentary side view of the spring tension adjuster and the tine angle stop adjustments.

DETAILED DESCRIPTION OF THE INVENTION

The invention relates to soil cultivation apparatus for cultivating rice and other crops and to methods which allow the apparatus to cultivate moist or dry earth to remove weeds from within a growing stand of rice and other crops, without regard to rows. The invention also relates to a method of growing rice which increases the tillering of rice and which does not require the use of herbicides or pesticides for suitable rice growth and yield.

Figure 1:
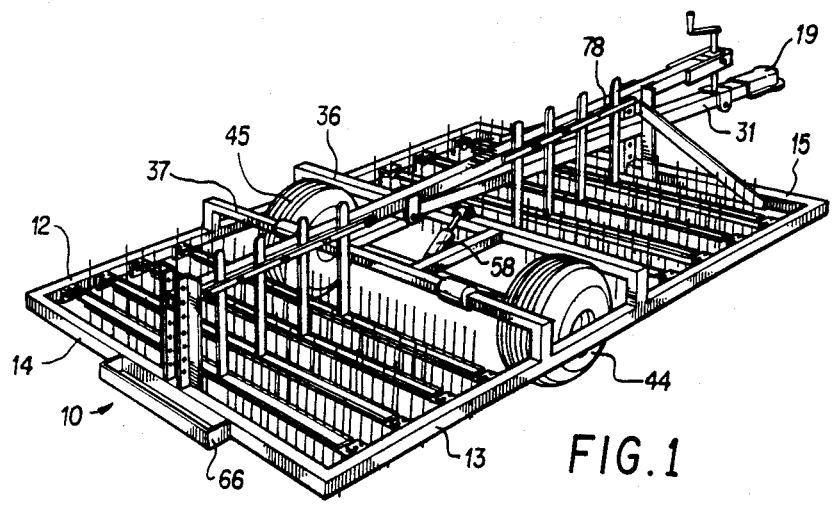
FIG. 1 is a perspective view of the apparatus in accordance with the teachings of the invention.
Figure 2:
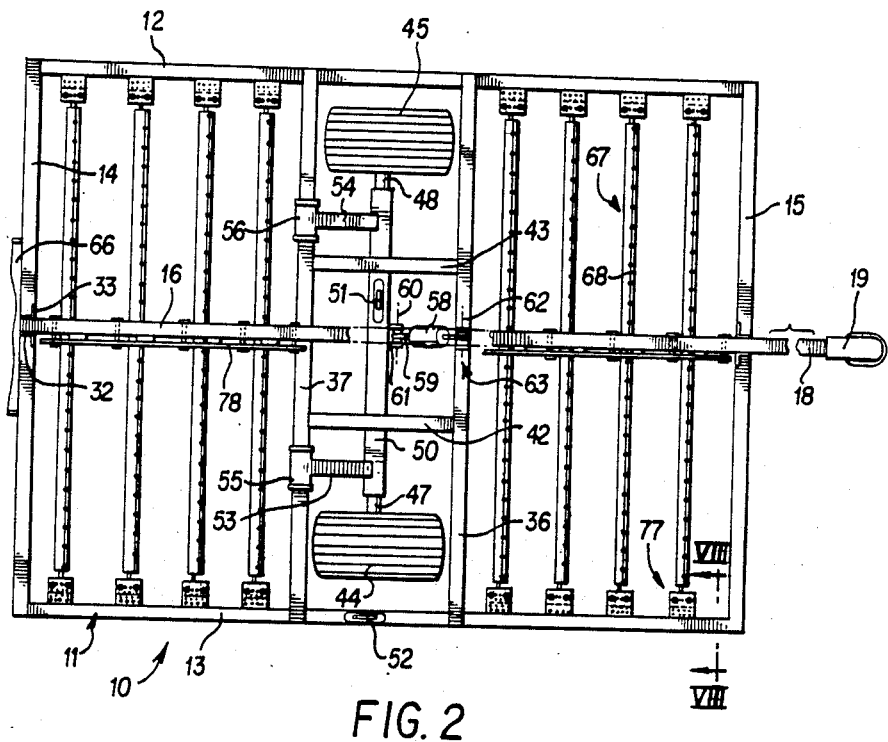
FIG. 2 is a top plan view.
Figure 3:
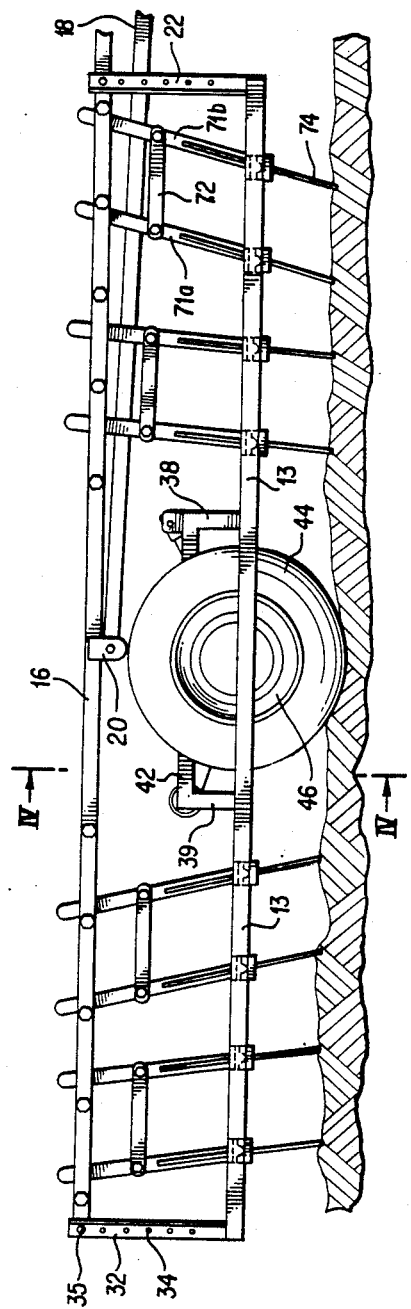
FIG. 3 is a side view.
Figure 5:
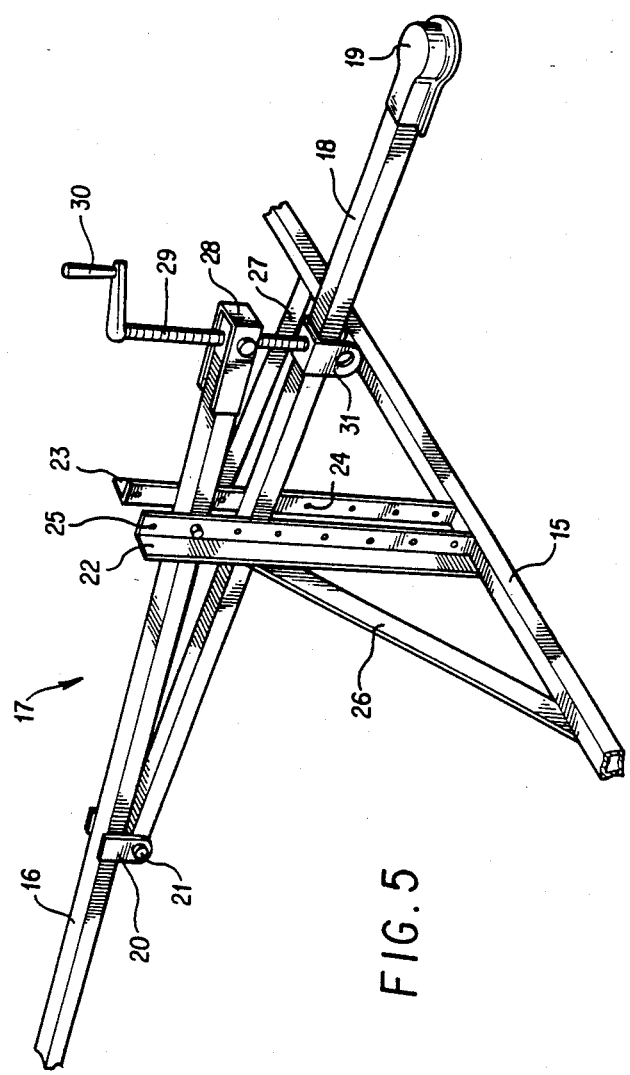
Figure 11:
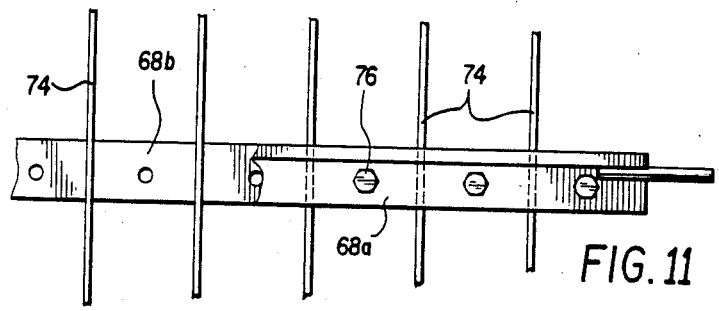
FIGS. 11, 12 and 13 are partial cutaway views taken along line XI—XI of FIG. 7.

One feature of the invention is a rice cultivating apparatus. FIG. 1 shows the cultivating apparatus 10. Referring now to FIG. 2 of the drawings, cultivating apparatus 10 is shown having a framework 11 comprised of elongated spaced side members 12, 13 interconnected respectively by elongated spaced end members 14, 15. As can be seen in FIG. 3, a top bar or member 16 extends along the top of framework 11 generally along the center longitudinal axis thereof. As can be seen in FIG. 5, connecting means 17 is shown for raising and lowering top bar 16 and coupling the apparatus 10 to a tractor or the like. Such connecting means 17 includes an elongated bar 18 having a tongue 19 at the forward end for coupling to the ball of a tractor or the like. Bar 18 is pivotally connected at its rear end to a flange 20, secured to top bar 16 via pivot pin 21. A pair of vertical flange supports 22, 23 are mounted on front end member 15 extending upwardly therefrom, each support 22, 23 having a plurality of spaced holes 24 for receiving screws 25 or the like therethrough for securing top bar 16 at spaced locations along supports 22, 23. Thus, the spacing between top bar 16 and lower side members 12, 13 and end side members 14, 15 of framework 11 can be quickly and easily adjusted.

As can be seen in FIG. 5, bar 18 is movable in an arcuate path between supports 22, 23. Supports 22, 23 may be optionally braced by side braces 26, 27, respectively, each secured to its respective support and to end member 15 in any suitable manner.

An apertured block member 28 is mounted on the forward end of top bar 16 receiving therethrough and in threaded engagement screw 29 having a control lever 30 at the upper end thereof. The bottom of screw 29 is fixedly secured to a flange 31 mounted to bar 18. It can be appreciated that rotation of screw 29 journalled in flange 31 by rotation of lever 30 will raise and lower top bar 16.

As can be seen in FIGS. 2 and 3, a pair of spaced flange supports 32, 33, identical to supports 22, 23, extend upwardly from end member 14 having spaced apertures 34 therein for receiving screws or nuts 35 for adjustably securing the same to top bar 16.

Figure 4:
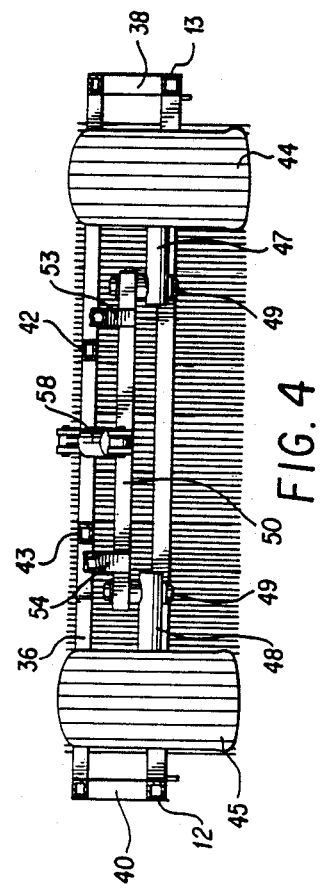
FIG. 4 is a partial sectional view taken along lines IV—IV of FIG. 3.

As can be seen in FIGS. 2 to 4, intermediate spaced connecting members 36, 37 extend between side members 12, 13 and are spaced upwardly above side members 12, 13, respectively, by means of vertical support bars 38, 39 at one end, and by vertical support bars 40, 41 at the other end (see FIG. 4). These connecting members 36, 37 are interconnected respectively by spaced bars 42, 43 (see FIG. 2).

As can be seen in FIGS. 2 and 3, a pair of tubeless flotation tires 44, 45 are provided, each having a central hub or wheel 46 (see FIG. 3, wherein only wheel 46 on tire 44 is shown) receiving therethrough axles 47, 48, respectively (see FIG. 4). As can be seen in FIG. 3, axles 47, 48 lie in generally the same plane as side members 12, 13 and end members 14, 15, and are interconnected, via bolts and nuts 49, to a main axle 50 (see FIG. 4). Bolts and nuts 49 may be used to level axle 50 and conventional levels 51, 52 (see FIG. 2) may be mounted on top of main axle 50 and end and side members 12, 13 and 14, 15, respectively, to aid in leveling the apparatus 10.

A pair of braces 53, 54 (FIG. 2) interconnect main axle 50 to conventional resilient hydraulic stops 55, 56, respectively, mounted to connecting member 37. These stops 55, 56 are secured to connecting member 37 by lock nuts and bolts 57.

Main axle 50 is activated by a conventional hydraulic ram 58 (FIGS. 2 and 4) having its piston rod 59 (FIG. 2) connected via pin 60 to a U-shaped flange 61 mounted to main axle 50 and connected at the other end 64 via pin 62 to a U-shaped flange 63 mounted to connecting member 36. In the preferred embodiment, two rams are attached to main axle 50 at each end to provide more even raising and lowering of the apparatus. As seen in FIGS. 1 and 2, a weight 66 may be provided on framework 11 on end member 14.

A plurality of spaced cultivator bars 67 (FIGS. 6 and 7) are provided at spaced locations within framework 11. Each bar is comprised of an elongated member 68 having two parts 68a and 68b, terminating in tubular ends 69, 70, respectively. An adjustment riser 71 is provided along member 68a, welded or otherwise secured thereto, having a control lever 72 fixedly secured thereto via nut and bolt 73. The pitch of cultivator bar 67 can be varied by moving control lever 72. Although only a portion of control lever 72 is shown in FIG. 7, as can be seen in FIG. 3, successive risers 71a, 71b can be moved simultaneously by movement of interconnected control lever 72. A plurality of spring-loaded elongated tine members 74 are disposed at spaced locations along cultivator bar 67. Each tine member 74 extends through a suitable aperture 75 in member 68a and 68b and is retained at any desired position therein by locking nuts and bolts 76 (see also FIG. 6) threaded into a threaded aperture normal to aperture 75. It can be appreciated that any suitable means may be used to adjustably mount tine members 74 to members 68a and 68b, and the vertical disposition of said tine members 74 can be quickly and easily adjusted accordingly. The adjustment of the pitch of cultivator bar 67 results in the adjustment of the pitch of the tine members 74, such that they may be positioned at any angle relative to the soil.

Control lever 72, as can be seen in FIG. 2, can also be secured to top bar 16 by straps 78. Thus, adjusting top bar 16 via vertical flange supports 22, 23 adjusts control lever 72 which, as heretofore discussed, changes the pitch of tine members 74.

Figure 12:
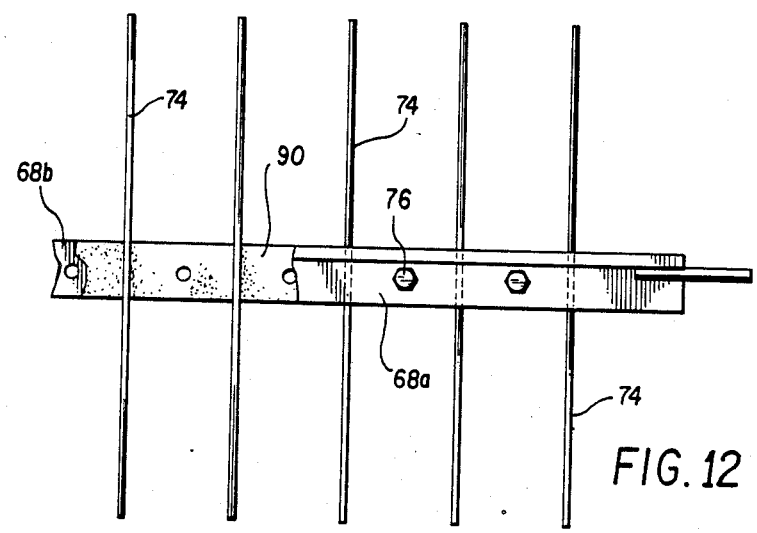
Figure 13:
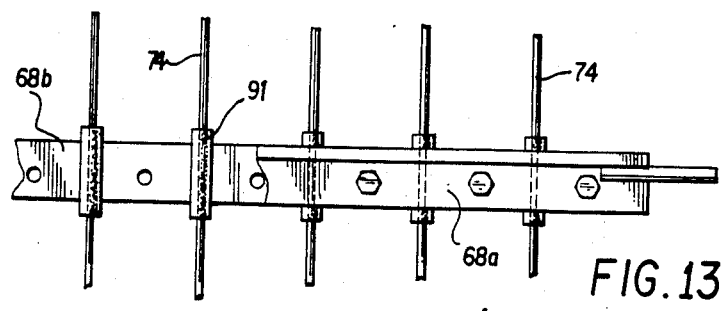

As can be seen in FIGS. 2, 8 and 9, an L-shaped adjustment plate 77 is welded to each side member 12, 13. In FIG. 9, plate 77 has an apertured plate portion 79 with a plurality of spaced apertures 80 therein. A bushing plate 81 (FIGS. 8 and 10) is bolted or otherwise secured, as by nuts and bolts 82 (FIG. 10) to apertured plate portions 79 within spaced apertures 80. Thus, the position of plate 81 can be adjusted with respect to plate 77. A cylindrical bushing 83 having a throughbore 84 (or at least a cavity therein) is mounted or otherwise secured to bushing plate 81. The tubular ends 69, 70 of cultivator bar 67 are journalled within oppositely disposed cylindrical bushings 83, as seen in FIG. 2. These tubular ends 69, 70 may friction-fit within cylindrical bushings 83 so that they are tightly retained therein. Other means may additionally be used to securely hold ends 69, 70 within cylindrical bushings 83. A shock-absorbing material 90 can be placed along the inner side of cultivator bar 67 as shown in FIG. 12. In another embodiment, shock-absorbing material 91 can surround or coat tine members 74 (FIG. 13).

Any suitable materials and dimensions may be used, such as strap iron, steel tubing, tempered steel, etc. The spacing on plate portion 79 of apertures 80 may be on three-inch centers in the horizontal direction and half-inch centers in the vertical direction. Any number of tine members 74 may be used, such as 24 tines for an eight foot wide framework which may be about nine feet long. Other widths and related spacing of tine members 74 may also be used. The distance between the tines 74 along each cultivator bar 67 ranges from two inches to sixteen inches, with four inches preferred. If larger distances are used, the number of bars must be increased to obtain a suitable tine spacing on the soil. An overall tine spacing on the soil can be precisely adjusted from one-half inch to two inches, preferably one half inch to one inch, by the use of multiple bars and by adjustment of each individual cultivator bar 67's position relative to the frame and each other. Each tine member 74 may be of any desired overall length, such as 14 inches long, and any desired dimensions, such as between about 0.15 and 0.25 inch, preferably 0.19 to 0.21 inch, in diameter or cross-section.

Any number of levels and suitable braces may be used. Control lever 72 may be a strap interconnecting a plurality of adjustment risers 71 so that they are all angularly adjusted simultaneously. The ram 58 may be any suitable hydraulic cylinder and of any suitable dimensions — for example, a 14 inch ram. Any suitable hydraulics, controls and components accessible at the tractor may be used to pull apparatus 10.

The vertical adjustment of framework 11 with respect to wheels 46 or tires 44, 45 determines the cultivation depth of tine members 74. The entire framework can be adjusted via the elongated bar 18 to level framework 11 from the front to the rear thereof.

Although single flotation tires 44, 45 have been disclosed, multiple tires may be used in other embodiments. Alternatively, axles 47, 48 can extend outside framework 11, and tires can be positioned outside framework 11. Also, although vertical elongated tine members 74 have been disclosed extending on both sides of the cultivator bars 67, the downwardly extending elongated tine members 74 may not extend above bar 67. The cross-section of tine 74 may be of any shape, including diamond, oval or circular.

Tongue 19 may be about five to six feet long (if the framework 11 is about eight feet wide and about 10 feet long) and may be either folded or easily removed as heretofore disclosed. Eight cultivator bars 67 may be used on such a framework, the aforementioned 24 tine members 74 being spaced apart at four-inch intervals. The spacing between the tine members 74, and their length, are easily and quickly adjustable to compensate for wear and to vary the depth of penetration. Tillage depth is precisely adjustable in one-eighth inch increments, or other increments as desired, from three inches into the soil to one-half inch above the soil, preferably no deeper than two inches into the soil. Wheels 46 are independently mounted and hydraulically adjustable flotation tires 44, 45 to control the height of the framework 11 from the ground and for dropping trash from tine members 74 are used. The weight 66 can be varied and placed where desired on either front or rear frame end members. Thus, framework 11 is coupled to a tractor and is pulled forward, tine members 74 removing the weaker weed plants while leaving the stronger rice plants intact. This apparatus can be used with any row or non-row spring-planted crop which is planted three-fourths inch or deeper into the soil. Herbicides and pesticides currently used to cultivate rice are eliminated.

The tine members 74 are small enough to go around or over rice plants but are big enough to take out weed plants, which have a less developed root system (as further discussed below). These tine members 74 are capable of vibrating in all directions (360°) upon contact with soil. As the apparatus 10 is pulled forward, vibration of tine members 74 is quickly and easily accomplished upon contact with soil. A harmonic vibration of the tines 74 removes the weed seedlings without a significant loss in numbers of rice seedlings. The vibrating tines completely till the entire soil surface. It is believed that the vibration which results in weed removal may be in a lateral direction when the tines 74 are pulled through the soil, or in a forward/reverse direction when the tines 74 are positioned just above the soil. This apparatus can be used prior to, during and after planting. The apparatus serves the functions of (1) breaking up the soil, (2) leveling the soil, (3) breaking up any crusting on top of the soil, and (4) removing weeds.

Individual tine members 74 are attached to the cultivator bar 67 in a manner that allows vibration of the tine members 74 in all directions (360°). Larger clods of soil and plant residue on the soil can pass through the tines, without becoming entangled therebetween. Thus, the tines 74 are self-cleaning. One tine arrangement that does not work with this method, however, is a spring tine arrangement. The spring tine vibrates primarily in a front-to-rear fashion, does not remain truly in line, and is not as effective in removing weed seedlings, in that multiple passes are required to completely cultivate the soil surface.

The pitch of tine members 74 is easily varied by moving levers 72. The tine members 74 can be raised via hydraulic ram 58 to enable the apparatus 10 to be moved without the tines dragging along the ground. Any number and location of tires 44, 45 can be used. Suitable brakes and lights may be placed on apparatus 10. Tine members 74 may be treated such as by carbide tipping the same to increase their life and overall efficiency. The control lever 72 can be used to vary the positioning of the teeth members 74. The tine members 74 thus can be quickly and easily adjusted so that they cover every half-inch of ground over which apparatus 10 is pulled.

Although the invention has been described wherein a single apparatus 10 is towed, obviously more than one apparatus may be towed using a single tractor, or the apparatus may be self-propelled. Tine members 74 can be lowered as they wear, and may either friction-fit in members 68 or be retained by fastening means 76 such as set screws.

Figure 14A:
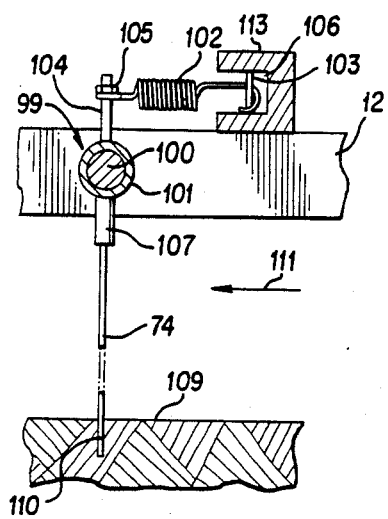
FIGS. 14a and 14b are fragmentary side sectional views of an embodiment of the invention employing a spring-loaded tine attached to the cultivator bar.
Figure 14B:
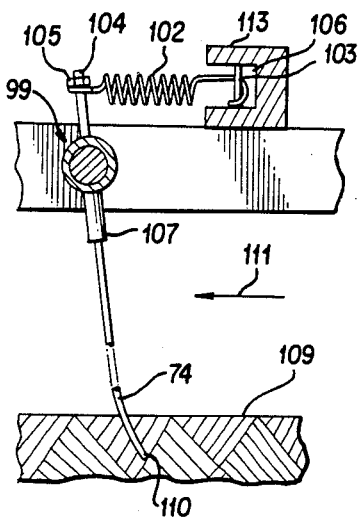

FIGS. 14a and 14b show another embodiment of the cultivator bar 99 of the present invention. A spring-loaded flexible tine 74 is attached to sleeve 101 by tine holder 107. The sleeve 101 is movably carried by the shaft 100. A tine extension 104 extends radially of the sleeve 101 as shown. Spring 102 is secured at one end to the tine actuator 104 by spring hold-down 105. The other end of the spring 102 is attached to a pin 103 in the channel 106 of U-shaped cross member 113. Shaft member 100 and the cross member 113 are mounted to the side members 12, 13 of the frame 10 (see FIGS. 14a and 14b, details of the frame).

Figure 15:
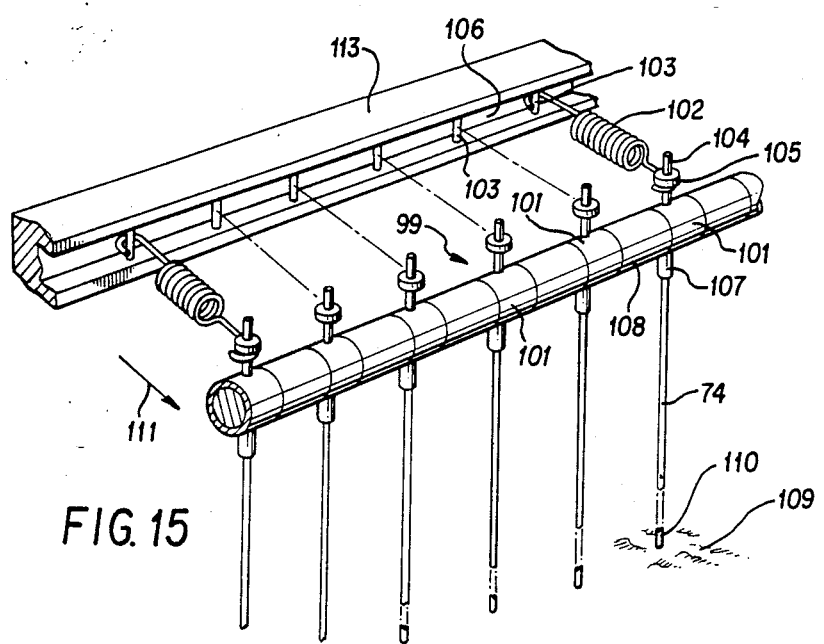
FIG. 15 is a fragmentary perspective view of the arrangement illustrated in FIGS. 14a and 14b.

FIG. 15 is a perspective view of the arrangement illustrated in FIGS. 14a and 14b, illustrating the cultivator bar 67 carrying a plurality of spring-loaded tines 74. In FIG. 14a, the tine 74 is in a neutral or undeflected position. In FIG. 14b, the tine 74 is shown deflected. The sleeves 101 mounted on shaft 100 are spaced by intermediate spacers 108. It is readily apparent from FIGS. 14a, 14b and 15 that, as the flexible tine engages the ground 109, the free end 110 of the tine 74 is forced in a direction rearwardly of the forward motion of the cultivator frame 10, as illustrated by the arrow 111, causing the tine 74 to deflect and the spring 102 to be stretched or extended. As the free end 110 of the tine 74 is raised above the ground 109, or if the ground 109 yields, the spring 102 (as well as the inherent flexibility of the tine) forces the tine 74 back to the neutral or vertical position illustrated in FIG. 14a.

Figure 16:
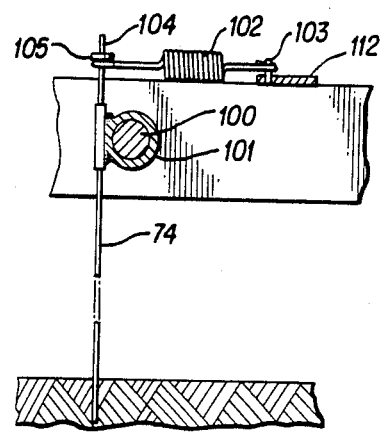
FIG. 16 is a side sectional view of the embodiment illustrated in FIG. 15.

FIG. 16 is a side view of another embodiment of the present invention employing a flat bar cross member 112 and an inverted pin 103 for securing one end of the spring thereto. Other elements in FIG. 16 are similar to the arrangements illustrated in FIGS. 14a, 14b and 15.

Figure 17:
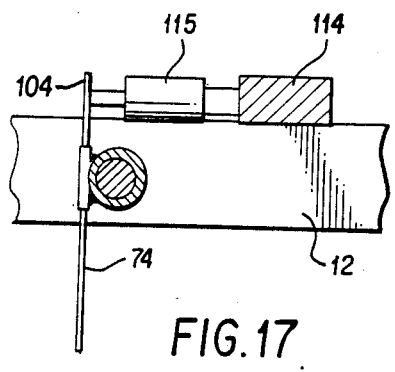
FIG. 17 is a side sectional view of the tine arrangement of FIG. 16.

FIG. 17 illustrates another embodiment of the invention similar to FIGS. 14a, 14b and 15, that employs a compressible oil-filled piston 115 instead of the spring 102. The piston 115 engages tine actuator 104 at one end and is secured at its other end to the cross bar 114.

Figure 18:
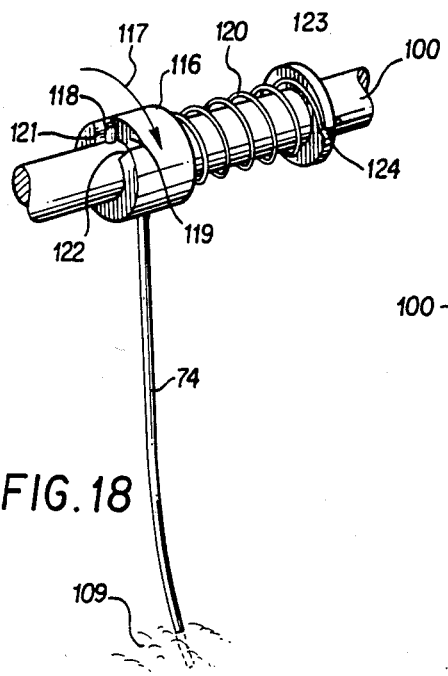
FIG. 18 is a fragmentary perspective view of another embodiment of a spring-loaded tine employing a spring coaxial with the cultivator bar.
Figure 19:
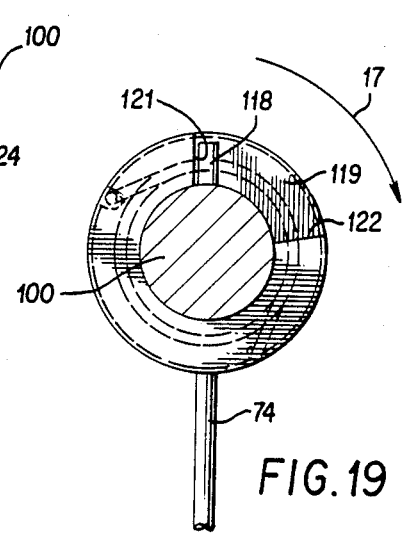
FIG. 19 is a fragmentary sectional view of the arrangement of FIG. 18.

FIG. 18 illustrates another embodiment of a spring-loaded flexible tine 74 in which a coaxial spring 120 is employed. The tine 74 is carried by a slotted sleeve 116 on the shaft 100. The spring 120 biases the sleeve and the attached tine 74 in the direction of the arrow 117. As the tine 74 is pulled across the ground, the tine urges the sleeve 116 against the bias of the spring 120 (i.e., opposite the direction of the arrow 117). A radial pin 118 engages the slot 119 in the sleeve 116. The sleeve 116 is movable between the ends 121-122 of the slot 119. In FIG. 19, the sleeve 116 and tine 74 are illustrated in the neutral position with the pin 118 engaging the forward end 121 of the slot 119. In operation, when the tine 74 is moved over the ground, the sleeve 116 rotates in the direction of the arrow 117 towards the rear or limit 122 of the slot 119. Slotted anchoring sleeve 123 secures the other end of the coaxial spring 120 in the slot 124.

Figure 20:
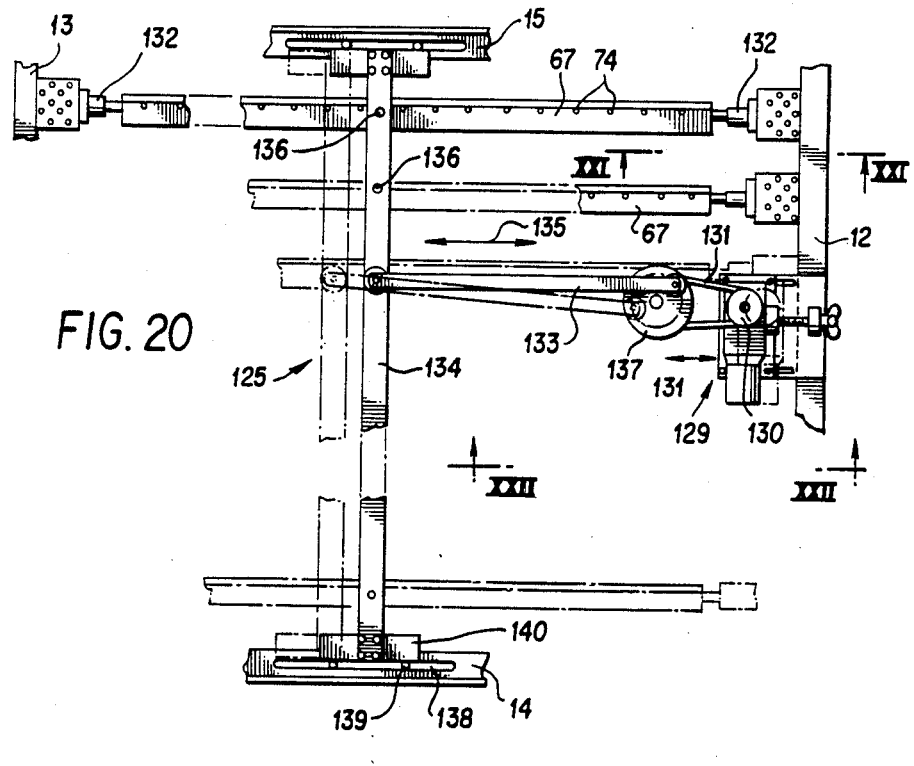
FIG. 20 is a fragmentary top plan view of an embodiment of the invention employing a mechanism for reciprocating the cultivator bar.

FIG. 20 illustrates another embodiment of the invention in which a reciprocal mechanism 125 is attached to the frame 10 for moving the cultivator bar 67 and the attached tines 74 transversely of the frame, side to side. The cultivator bars 67 are movably secured to the frame 10 by means of linear bearings 132 at each end thereof. The linear bearings 132 allow side-to-side lateral motion of the cultivator bars 67 in the direction of the arrow 135. As the cultivator bars 67 are moved laterally from side to side, the tines 74 carried thereby engage the ground in a side-to-side motion as the frame 10 is moved in a forward direction.

A drive mechanism 129 is provided for reciprocally moving the cultivator bars 67. The drive mechanism 129 includes a drive pulley 130, a belt 131, a driven pulley 137 interconnected with the drive pulley via the belt, and a connecting rod 133 coupled to the driven pulley 137. A common driver bar 134 is movably connected to each of the cultivator bars 67 by a corresponding connecting pin 136. The common driver bar 134 is secured for reciprocal movement in slotted mountings 138 on the respective front and rear portions 15 and 14 of the frame 10. The slotted mounting 138 includes a plate 140 at each end of the common driver bar 134. The plate 140 has pins 139 which engage slots 138 in the frame 10 to guide the lateral motion of the support plate 140 and the reciprocal driver bar 134. Connecting rod 133 couples the driven pulley 137 with the common driver bar 134 so that as the driven pulley 137 is rotated, the common driver bar 134 is reciprocated by the crank action of the pulley 137 and the connecting rod 133.

Figure 21:
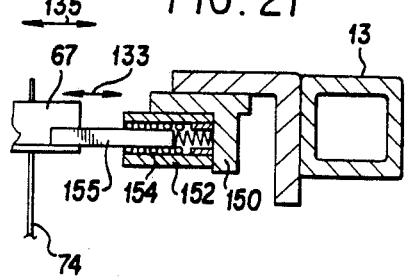
FIG. 21 is a side sectional view taken along lines XXI—XXI of FIG. 20.

FIG. 21 illustrates the linear bearing 132 in detail. Linear bearings are well known in the art, and generally include a bearing support 150, a bearing sleeve 152, and a plurality of ball bearings 154 in the sleeve 152. A shaft portion 155 at the end of the cultivator bar 67 is located inside the bearing sleeve 152 as shown. The shaft portion 155 is movable in the direction of the arrow 135 to thereby allow the cultivator bar 67 and the attached tines 74 to move from side to side.

Figure 22:
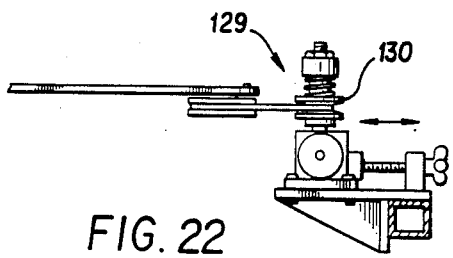
FIG. 22 is a side sectional view taken along lines XXII—XXII of FIG. 20.

FIG. 22 shows the side view of drive mechanism 129.

Figure 23:
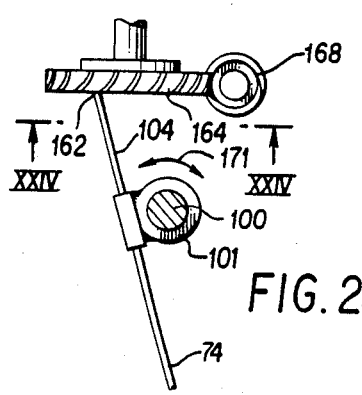
FIG. 23 is a partial sectional fragmentary side view of a mechanism for mechanically reciprocating the tines.
Figure 24:
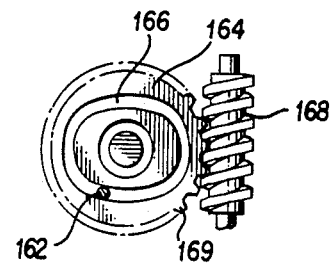
FIG. 24 is a top plan view of the arrangement illustrated in FIG. 23, taken along lines XXIV—XXIV thereof.

FIGS. 23 and 24 illustrate an embodiment of the invention employing tines 74 actively driven by an eccentric drive including a slotted cam 164. The shaft 100 supporting the sleeve 101, tine 74 and tine extension 104 is similar to the arrangement illustrated in FIGS. 14a, 14b and 15. The end 162 of the tine extension 104 engages the slot 166 in the cam 164. A worm drive 168 engages gear teeth 169 on the cam 164. The worm drive 168, supported by means not shown, drives the cam 164 which reciprocates the tine 74 in the direction of the arrow 171. If desired, the sleeve 101 may be loosely supported on the shaft 100 such that it is movable axially of the shaft 100 (into and out of the page of the drawing), so that the tine has two degrees of freedom. In other words, the tine 74 may move front to back of the frame 10, and side to side thereof simultaneously.

Figure 25:
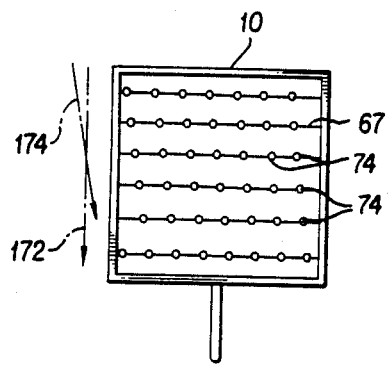
FIGS. 25 and 26 are schematic top plan views illustrating various tine layouts.
Figure 26:
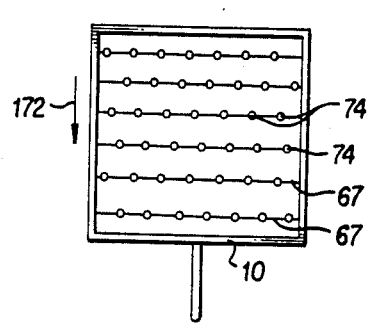

FIGS. 25 and 26 show various possible tine layout arrangements. In FIG. 25, the tines 74 are mounted on the spaced cultivator bars 67 such that the alignment of the tines 74 from one cultivator bar 67 to the next is slightly skewed from the forward direction designated by the arrow 172 to the right, in the direction of the arrow 174. The skew can have the effect of causing the apparatus 1? to drift sideways as it is pulled across the field. In accordance with the invention, therefore, it is preferred to arrange the tines in such a manner that any bias which would cause the frame 10 to drive in either direction is minimized or eliminated.

FIG. 26 illustrates one preferred embodiment in which the tines 74 are alternately offset from row to row to prevent the bias and side-drifting motion of the frame 10. It is also possible that a more random arrangement of tines 74 may provide the same effect.

Figure 27:
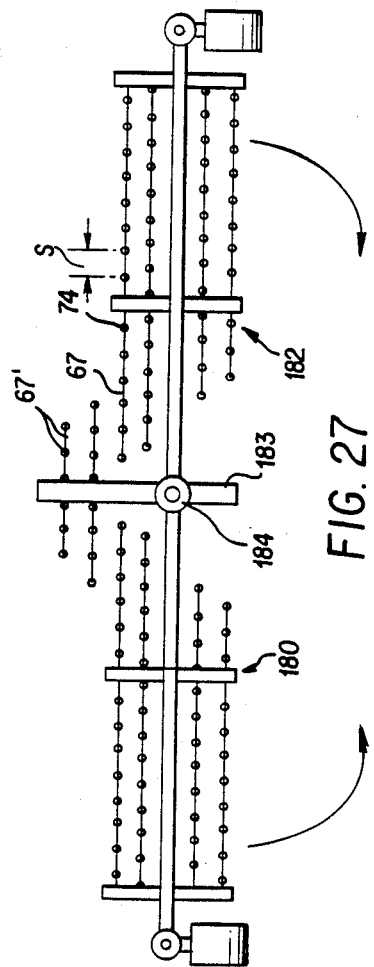
FIGS. 27 and 28 are top plan views of another embodiment of the invention employing a bat-wing cultivator bar in respective laterally extended and rearwardly extended positions.
Figure 28:
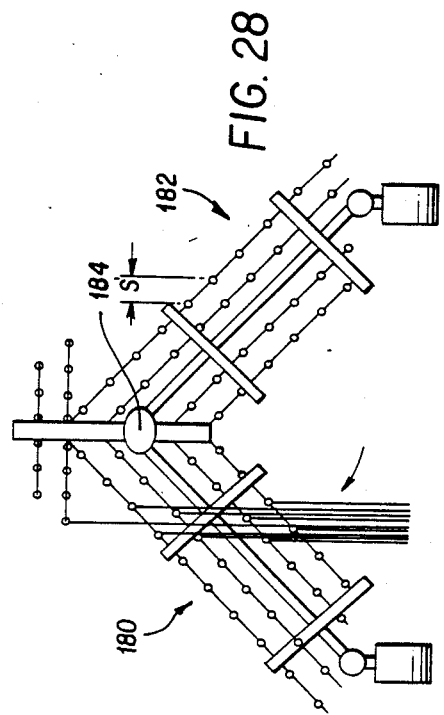

FIGS. 27 and 28 illustrate another embodiment of the invention employing a "bat-wing" arrangement of cultivator bars 67. Adjustable rotating wings 180, 182 carry the cultivator bars 67 and the tines 74. The wings 180, 182 are rotatably secured to the axial support 183 by means of a center pivot mechanism or hinge 184. The adjustable wings 180, 182 allow improved handling of plant residue and trash on the surface of the soil, and allow a broad range of tine spacing arrangements as the apparatus 10 is pulled over the soil. It can readily be seen from the illustration of FIGS. 27 and 28 that as the wings 180, 182 are rotated about the hinge 184, the lateral spacing (for example, S in FIG. 27) is effectively reduced to a narrower spacing S' as illustrated in FIG. 28. Fixed cultivator bars 67' attached to the axial support 183 may also be provided.

Figure 29B:
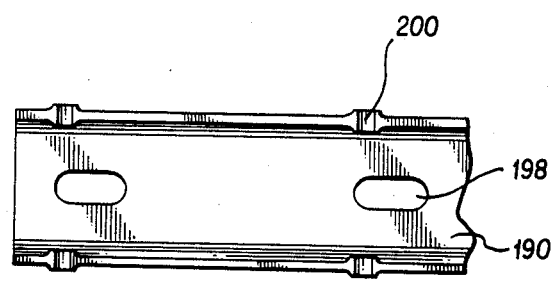
Figure 29A:
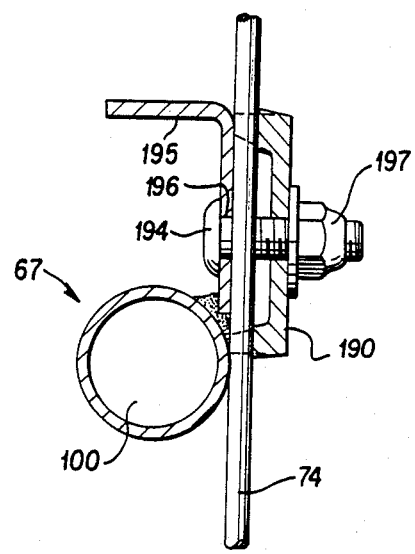
FIG. 29a is a fragmentary side sectional view of a vertically adjustable tine-bar arrangement of the invention.

FIG. 29 shows another embodiment of the cultivator bar 67 of the invention wherein tine support 195 is attached to shaft 100. A clamp 190 secures the tines 74 to the tine support 195 by means of a bolt 194 and nut 197. The clamp 190 has recesses 200 to capture the tines against tine support 195 in a stable position. The support 195 has one or more bolt holes 196, and the clamp 190 has one or more elongated holes or slots 198 which bolt holes or slots are designed to receive the bolt 194. Thus, the position of the tines 74 along the cultivator bar 67 may be laterally adjusted to the extent of the size of the elongated holes 198. Also, the vertical depth of the tines 74 may be adjusted within the recesses 200.

Figures 30, 31:
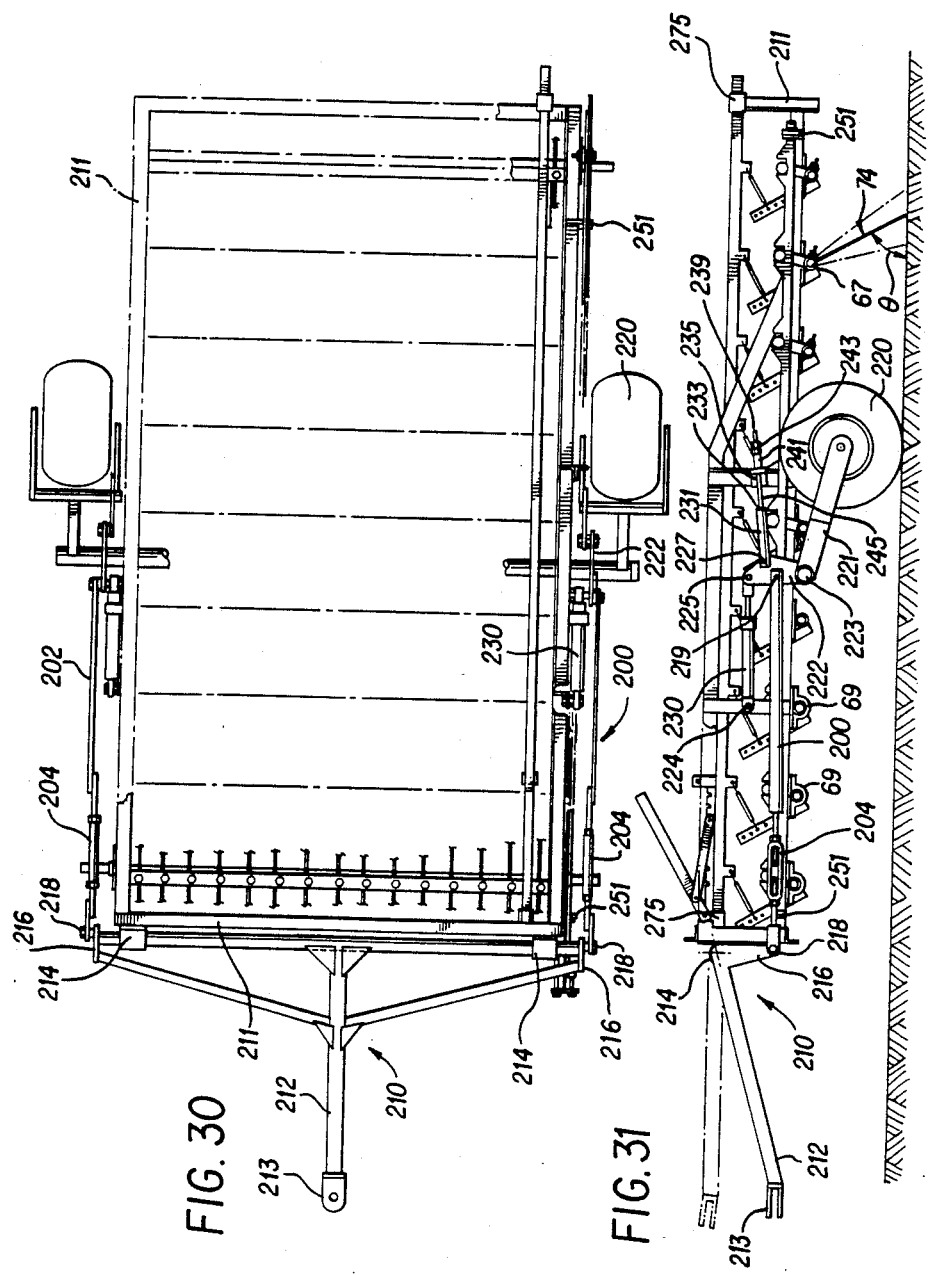
FIG. 30 is a fragmentary top plan view of another embodiment of the invention.
FIG. 31 is a fragmentary side sectional view of the apparatus illustrated in FIG. 30.

FIGS. 30 and 31 illustrate another embodiment of the invention employing a leveling feature. A front hitch assembly 210 is pivotally coupled to frame 211 about pivot bearing 214. The front hitch 213 includes forwardly extending tongue 212 for attachment to a tractor (not shown) and a downwardly extending forward actuator arm 216. An adjustable length leveling rod 200 is rotatably connected to the lower end of actuator arm 216 by means of an appropriate fastener 218 such as a bolt and nut. A pair of wheels 220 are mounted for rotation on adjustable wheel support 221. Wheel support 221 is rotatably mounted on main axle 223 attached to the frame 211. An upwardly extending rearward actuator arm 222 rigidly attached to the wheel support 221 extends upwardly from main axle 223. The leveling rod 200 is rotatably connected to the rearward actuator arm 222 by means of an appropriate fastener 219, so that as tongue 212 moves upward, the wheel 220 is driven upward in relation to frame 211 to thereby maintain frame 211 in an approximately level position from front to rear. As shown in FIG. 31, the leveling rod 200 includes a turnbuckle 204 for adjusting the total length of said rod 200 and more firmly adjusting the level of the frame 211.

In order to provide a means for raising and lowering the apparatus into and out of the soil, hydraulic piston 230 is connected between the frame 211 and the upper end of the rear actuator arm 222 by means of appropriate fasteners 224 and 225. When it is desired to raise the frame, the piston 230 is extended, thereby driving the rear actuator arm 222 rearwardly and likewise driving the wheel support 221 and wheel 220 downwardly. In order to lower the frame 211, the piston 230 is retracted. A piston-limiting link 231 is rotatably attached at one end to the rear actuator arm 222 by an appropriate fastener 227. An apertured tab 235 secured to the frame 211 receives the threaded end 239 of the piston-limiting link 231 therein. The threaded end 239 receives a length adjustment shim 241 thereon for abutment with the tab 235. Locking bolts 243 adjustably secure the shim 241 on the link 231. The position-limiting link 231 limits the forward motion of rear actuator arm 222 of the piston 230 by means of the abutment of the shim 241 and the tab 235. Elongated rod portion 245 of the link 231 is freely slidable in tab 235 to thereby allow the rear actuator arm 222 to move rearward when the piston 230 is extended. Frame 211 may be finely levelled from side to side by adjusting the shims 241 on the sides of the apparatus.

The tine angle adjustment apparatus is shown in FIGS. 30 through 32. A pair of inner and outer tine adjustment bars 234, 236 are mounted to the side of the frame 211 by means of slotted brackets 251. Cultivator bars 67 are rotatably supported in frame 211 by bearings 69 at each end thereof. A tine adjustment actuator 238 is rigidly attached to the cultivator bar 67 for a rotation therewith. Inner tine adjustment bar 234 has front stops 242. Outer tine adjustment bar 236 has rear stops 244. Tine adjustment actuator 238 has a bolt or pin 240 attached thereto at its free end. The pin 240 rests on the adjustment bars 234, 236 within the gap 237 formed between the stops 242, 244.

The tine 74 and the ground form the angle theta (FIG. 31). The angular position of the tine adjustment actuator 238, and hence the tine angle theta, is determined by the position of the pin 240 within the stops 242, 244. If the gap 237 is increased by increasing the separation of the stops 242, 244, the tine angle can vary between limits established by said stops (see the phantom lines in Fig. 31).

An adjustment mechanism 257 is provided in order to adjust the gap between the stops 242, 244. A threaded support 249 carried by the frame 211 has a threaded opening 259 for receiving first lead screw 261 secured in a bushing 265 in a movable bracket 263. A second lead screw 271 is secured to the bracket 263 for rotation in bushing 275. The threaded end 273 of the second lead screw 271 is threadably secured in the threaded ear 250 attached to the end of the outer adjustment bar 236. The movable bracket 263 is attached to the end of the inner adjustment bar 234 and also carries with it the outer adjustment bar 236. When rotated, first lead screw 261 carries both adjustment bars 234 and 236 back and forth in the direction of the double-headed arrow 310, thereby moving the stops 242, 244 together relative to the frame 211 for adjusting the tine angle theta. Thus, the first lead screw 261 moves both adjustment bars 234, 236 together As the second lead screw 271 is rotated, however, only the outer adjustment bar 236 moves relative to the frame 211, whereby the gap 237 is widened or narrowed. Thus, the tolerance of the tine angle theta is adjusted by the second lead screw 271.

FIG. 32 shows a spring tension adjuster 270 which is coupled to the cultivator bar 67 in order to control the amount of tension on the tines 74. Riser 71 is attached to the cultivator bar 67 for rotation therewith. Adjustment bar 274 is slidably mounted in rectangular bushings 275 at opposite ends of the frame 211. Biasing spring 272 is secured at one end in one of the adjustment holes 277 in the riser 71, and its other end is secured in the apertured tab 279 on the adjustment bar 274. Tension on the spring 272, and hence the tines 74, is adjusted by moving the adjustment bar 274 in the direction of the double-headed arrow 281.

An adjustment bar positioning mechanism 290 is provided for selectively positioning the adjustment bar 274 relative to the frame. A rack 292 is secured to adjustment bar 274 for movement therewith. The rack 292 has notches 293 therein. Over-center lever 294 is rotatably secured to the frame 211 by pin 296. Lock actuator 295 is rotatably secured at one end to the lever 294 by pin 297. The free end of the lock actuator 295 has confronting bars 300 joined by a rack pin 301. The pin 301 is selectively positionable in any one of the notches 293 in the rack 292. The position of the adjustment bar 274 is thus selected by positioning the rack pin 301 in any one of the notches 293 of the rack 292, and by thereafter moving the over-center lever 294 downwardly. The over-center lever 294 thus locks in a rest position in abutment with the rack 292 to thereby secure the adjustment bar 274 in place. When the lever 294 is lifted away from the rack 292, the rack actuator 295 pivots about the over-center pivot point 297 to unlock the adjustment bar 274 and thereby allow repositionment of the rack pin 301 if it is desired to further adjust the tension on the spring 272 and hence the tines 74.

Another feature of the invention is a process of growing rice and other crops under conditions such that herbicides and pesticides are not required. In the preferred process, the seed bed is prepared to break up the soil and any plant residue. Fertilizer can be incorporated into the soil at a depth of one to four inches, preferably two to four inches, below the seed planting depth. Starter fertilizer may also be applied with the rice seeds. Soaked or dry seed is planted into the soil at a depth of two to four inches. Planting dry seed is preferred. The field is flush-irrigated with water and then drained. Before, during and after planting, the field may be cultivated with the disclosed apparatus to remove weeds. Nitrogen fertilizer can be applied as a top dressing. No herbicides or pesticides are used. The planted surface may be cultivated to break up the soil surface and promote seedling emergence if the soil has become crusted from rainfall compaction or the flush-irrigation. After draining the initial flush-irrigation, the paddies are not irrigated for an extended period of time.

The variations in seed treatment, planting depth, and irrigation cycle cause development of desired crop plants that differ in size and vigor from the weed species. The process of the invention for growing rice begins with seed bed preparation. The seed bed is prepared according to conventional techniques. For example, the soil in the rice paddies is chiseled and disced once to several times to break up the soil. A triplane is used to level the soil. A cultipacker may be added behind the triplane to achieve a soil clod size of about one inch, which is smaller than in conventional seed bed preparation. Fertilizer is added several inches deeper than in the conventional manner, when the seed is planted deeper than in the conventional procedure. A starter fertilizer is placed near the seed during planting.

This invention provides three methods of planting the rice seed, depending on existing soil moisture. If the soil at a two-inch depth will stay compressed when squeezed between thumb and forefinger, then the natural soil moisture is adequate and 90–95% germination of planted rice seeds will be obtained. Under these soil moisture conditions, dry or soaked rice seeds are drill-planted at a depth of about two inches to about four inches, preferably two to three inches deep. Any suitable soaking procedure can be utilized. The following soaking process has been found to be suitable: (1) the rice is soaked in water for a minimum of 12 hours; (2) the water is drained off the seed for at least 12 hours (until the rice seeds will separate easily), and then (3) the seed is planted within 36 hours, preferably immediately after draining. The soaked rice seed enhances rapid germination and seedling emergence from the soil.

If the natural soil moisture is too dry to plant, then a second planting method is to drill dry rice seed two to four inches deep into the dry soil. The rice field is irrigated once and excess water is drained off the field as quickly as possible. This process is known as flush-irrigation. The irrigation will germinate both rice and weed seedlings. The field is cultivated with the disclosed apparatus to remove the weeds when the top portions of soil clods are dry and the bottom portions are wet. Generally, the cultivation is conducted four to eight days after irrigation.

The third method of planting is also used when natural soil moisture is lower than adequate for planting. In this method, the field is flush-irrigated before planting. When soil moisture is proper (as described for the first method), usually after seven to 10 days, the seedbed is cultivated and rice seed is then planted as described for the first method.

If the rice field receives rainfall, or if an additional irrigation flushing is utilized, and weeds have germinated, the field can be cultivated to remove weed seedlings. The cultivating is performed as previously described. In some instances several cultivations may be necessary, preferably as soon as the soil is dry enough to cultivate.

Conventional rice production has either a permanently flooded environment or has repeated irrigation flushings to keep the field very wet (muddy). The conventional rice growing methods keep the rice under anaerobic conditions for most of the 25–50 days after planting. This method requires monitored and reduced irrigation for the first 25–50 days after planting the rice seed. This reduced irrigation induces a stress environment for both rice and weed seedlings. The rice seed is planted two to four inches deep into soil moisture, which promotes stronger, heavier and deeper root development as the roots grow down into the deeper soil moisture. By not irrigating, the top one to three inches of soil remains relatively dry, thus reducing weed seed germination and weed seedling viability.

Contrary to the conventional procedure of germinating and growing rice under anaerobic conditions, the process of this invention grows rice under substantially aerobic conditions for the first 25–50 days. The aerobic environment of this process allows increased temperature and sunlight conditions for the rice plants until the field is permanently flooded 25–50 days after planting. It is preferred to flood at the fourth leaf stage.

The increased tillering and increased root development enable rice plants to withstand cultivation while weeds are easily removed, a result of (1) the formation of a deeper and heavier root system; (2) the moisture stress on the rice plant, which lowers the indole acetic acid (a plant hormone) level in the apical meristem; (3) the increased availability of sunlight to rice plants, as compared to a conventional flooded environment, which lowers the indole acetic acid level in the apical meristem; (4) the increased soil and air temperatures, when compared to a flooded environment, or (5) any combination of these or additional factors. The drier-than-conventional soil conditions for the first 25–50 days provide increased amounts of oxygen to developing rice roots, thereby stimulating their growth and development. This factor, coupled with increased availability of sunlight during the early stages of plant growth, promotes increased tillering of individual rice plants. The increased tillering capability allows the stronger, healthier rice plants to out-compete and shade out the weaker weed plants, thereby reducing weed problems, especially those problems associated with weed growth normally stimulated by application of irrigation water.

In this process, the rice field is not permanently flooded until 25–50 days after planting and thus does not provide an adequate habitat for the growth and spread of such insects and microbial pests as leaf miners, rice weevils, rice midge, tadpole shrimp or algae. Since pests are not a problem in the method of the invention, the use of pesticides which are currently needed for successful paddy rice crop cultivation is not required with the process of the invention. Since any weeds which may germinate at any time prior to flooding can easily be removed by cultivation, the use of herbicides is likewise unnecessary in the present invention. Since the rice field is not flooded for 25–50 days following planting, less water is required in the present process to grow rice to harvest. After the rice field is flooded, either permanently or by periodic flushings to keep the soil wet, the rice is grown and harvested by conventional techniques.

The invention will be further described by reference to the following non-limiting examples:

EXAMPLE 1

In spring 1987, approximately 10 acres of rice variety M202 were drill-planted without addition of fertilizer on two different planting dates. The seedlings emerged on June 5 and June 12. The seedling rate was approximately 68 pounds of rice per acre. A small cultivator which removed weed plants but did not seriously damage rice plants was used one to three times, both before and after seedling emergence. Important weed species such as cocklebur, fireweed, spangle top and watergrass were counted before cultivation at an average of 2.9 weed plants per square foot, based on 107 square feet of random plot. The cultivator reduced the average density to 0.49 weeds per square foot. Herbicides and pesticides were not used. At the end of the growing season, the cultivated plots had an average of 36 heads per square foot, and an average of 71 kernels per head, for an estimated yield of 4,500 pounds per acre. The control, which received the same treatment but was not cultivated, had an average of 22 heads per square foot and 50.6 kernels per head, for an estimated yield of 2,300 pounds per acre. The use of the cultivator and the method of this invention increased the yield by 95% over the control yield.

EXAMPLE 2

In April 1988, a field was disced once, then disced again with a spike-tooth harrow pulled behind a disc and then triplaned. 100 units of nitrogen were added at a depth of six inches. During May 20-23, soaked rice seed was drill-planted at a depth of two inches into the soil, at a rate of 105 pounds of seed per acre. The seed was soaked 12 hours in water and then drained 12 hours prior to planting. Fertilizer (47 pounds of 18-46-0 per acre) was incorporated with the seed. A cultivator was not used. On June 26, 34 days after planting, the field was started on a permanent flood. By July 1, the entire field was under one to six inches of water. 40 units of ammonium sulfate fertilizer were aerially applied on July 23. The rice field was harvested on October 17, 18 and 19. There were 150 days from planting date to harvest date, and 97 days under permanent flood. The yield was 65.9 CWT per acre, while the average yield using conventional rice growing methods on adjacent farm fields was 65.7 CWT per acre.

EXAMPLE 3

Recommended Procedures

In spring, prior to planting, first chisel plow the field, then disc and harrow one or more times until a good seedbed is prepared. This is followed by triplaning to level the field. Drill-plant 85-150 pounds of dry seed two to three inches deep into the soil, depending on soil type. Based on soil analysis of the field, add a starter fertilizer with the seed. After planting, flush-irrigate and drain as quickly as possible. Apply no more water to the field than is needed to cover the ground, approximately two to four inches of water. Use a cultivator, which removes weed plants and does not remove or seriously damage rice plants, as soon as soil is dry enough (usually five to seven days after flushing). Cultivate after any rain, or when the soil crusts on its surface, or when more weed seedlings emerge from the soil. Cultivate one to two days before final permanent flooding, when the rice plants are six to eight inches in height and approximately 25-50 days after planting. Also, urea or ammonium sulfate (in an amount based on soil analysis) can be broadcast one to two days prior to permanent flood. Keep the field flooded until prior to harvest. If needed, aerially apply fertilizer, preferably with ammonium sulfate, just before the rice enters the flowering stage. The fertilizer amount can be based on foliar analysis. No pesticides or herbicides are used during the growing season.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What is claimed is:

1. An apparatus for cultivating rice and any crop which is planted three-fourths inch or deeper into the soil, comprising:
   a framework;
   a plurality of longitudinally spaced elongated bars extending across said framework;
   a plurality of resilient elongated downwardly extending substantially linear through their length tine members disposed at uniformly spaced locations along each of said bars capable of vibrating in all directions (360°) while contacting the soil, said tine members being offset in each successive bar from the tine members of any other bar and capable of working substantially 100 percent of the soil surface;
   means on each of said bars for securing a straight portion of the tine to the bar; and
   wheel means engaging said framework for moving said framework in a rolling motion across a surface.

2. The apparatus of claim 1, which further comprises framework raising and lowering means associated with said wheel means and said framework for selectively raising and lowering said framework with respect to said wheel means.

3. The apparatus of claim 1, wherein said elongated bars are about five to 25 feet wide and said tine members on each of said bars are spaced about two inches to sixteen inches apart.

4. The apparatus of claim 1, wherein said apparatus comprises segments five to 25 feet wide which are used individually or linked together.

5. The apparatus of claim 1, wherein said tines are associated with shock-absorbing means to lengthen the durability of the tines.

6. The apparatus of claim 1, further including resilient mounting means for the tines, wherein the resilient mounting means includes means rotatably secured to each spaced elongated bar for rotation thereon, and spring means coupled between the tine support means and the framework for biasing the tine to a neutral position with respect to the framework.

7. The apparatus of claim 1, including leveling means on said framework for determining the level of said framework with respect to a supporting surface, both laterally and front to back.

8. The apparatus of claim 1, including a means for vibrating the tines.

9. The apparatus of claim 1 including means for rotatably mounting said tines about an axis transverse of the framework which allows variable tine-spacing adjustment and improves handling of plant residue.

10. The apparatus of claim 1 including a means of adjusting the tension on said tine.

11. An apparatus for cultivating rice and any crop which is planted three-fourths inch or deeper into the soil, comprising:
    a framework;
    a plurality of longitudinally spaced elongated bars extending across said framework;
    a plurality of resilient elongated downwardly extending substantially linear through their length tine members disposed at uniformly spaced locations along each of said bars capable of vibrating in all directions (360°) while contacting the soil, said tine members being offset in each successive bar from tine members of any other bar and capable of working substantially 100 percent of the soil surface;

pitch varying means coupled to said elongated members for varying the pitch of said tine members; and wheel means engaging said framework for moving said framework in a rolling motion across a surface.

12. The apparatus of claim 11, which further comprises framework raising and lowering means associated with said wheel means and said framework for selectively raising and lowering said framework with respect to said wheel means.

13. The apparatus of claim 11, wherein said elongated bars are about five to 25 feet wide and said tine members on each of said bars are spaced about two inches to sixteen inches apart.

14. The apparatus of claim 11, wherein said apparatus comprises segments five to 25 feet wide which are used individually or linked together.

15. The apparatus of claim 11, wherein said tines are associated with shock-absorbing means to lengthen the durability of the tines.

16. The apparatus of claim 11, including leveling means on said framework for determining the level of said framework with respect to a supporting surface, both laterally and front to back.

17. The apparatus of claim 11, including a means for vibrating the tines.

18. The apparatus of claim 11 including a means of adjusting the tension on said tine.

19. An apparatus for cultivating rice and any crop which is planted three-fourths inch or deeper into the soil, comprising:

a framework;

a plurality of spaced elongated bars extending across said framework;

a plurality of elongated downwardly extending tine members disposed at spaced locations along each of said bars, said tine members randomly oriented between said bars, capable of vibrating in all directions (360°) while touching the soil and capable of covering 100 percent of the soil surface;

pitch varying means coupled to said elongated members for varying the pitch of said tine members;

resilient mounting means for the tines, wherein the resilient mounting means includes means rotatably secured to each spaced elongated bar for rotation thereon, and spring means coupled between the tine support means and the framework for biasing the tine to a neutral position with respect to the framework; and wheel means engaging said framework for moving said framework in a rolling motion across a surface.

20. The apparatus of claim 19 including a means of adjusting the tension on said tine.

21. The apparatus of claim 19, which further comprises framework raising and lowering means associated with said wheel means and said framework for selectively raising and lowering said framework with respect to said wheel means.

22. The apparatus of claim 19, wherein said elongated bars are about five to 25 feet wide and said tine members on each of said bars are spaced about two inches to sixteen inches apart.

23. The apparatus of claim 19, wherein said apparatus comprises segments five to 25 feet wide which are used individually or linked together.

24. The apparatus of claim 19, wherein said tines are associated with shock-absorbing means to lengthen the durability of the tines.

25. The apparatus of claim 19, including leveling means on said framework for determining the level of said framework with respect to a supporting surface, both laterally and front to back.

26. The apparatus of claim 19, including a means for vibrating the tines.

27. An apparatus for cultivating rice and any crop which is planted three-fourths inch or deeper into the soil, comprising:

a framework;

a plurality of longitudinally spaced elongated bars extending across said framework including tine mounting means rotatable about an axis with respect to the framework;

a plurality of resilient elongated downwardly extending substantially linear through their length tine members disposed at uniformly spaced locations along each of said bars being secured thereto by said tine mounting means and being capable of vibrating in all directions (360°) while contacting the soil, said tine members being offset in each successive bar from the tine members of any other bar and capable of working substantially 100 percent of the soil surface;

spring means secured between the framework and the tine mounting means for biasing the tine members carried by the bars; and wheel means engaging said framework for moving said framework in a rolling motion across a surface.

28. An apparatus for cultivating rice and any crop which is planted three-fourths of an inch or deeper into the soil, comprising:

a wheeled framework for moving the framework in a rolling motion across the surface;

a plurality of longitudinally spaced elongated bars extending across the framework;

a plurality of resilient elongated downwardly extending tine members being substantially linear throughout their length disposed at uniformly spaced locations along each of said bars and capable of vibrating in all directions 360° while contacting the soil, said tine members in each successive bar being offset from the tines of any other bar so that the overall spacing between the tines from side to side across the framework is sufficient to prevent tracking of the tines so that the tines are capable of working substantially 100% of the soil surface.

29. The apparatus of claim 28 wherein the tines extend about 8 to 14 inches from the bar and the overall spacing of the tines is about ½ inch.

30. The apparatus of claim 29 wherein the tines have a diameter of about 0.25 inches.

31. The apparatus of claim 30 wherein the tines are disposed to the pitch between about 30° and 90° with respect to the surface.

32. An apparatus for cultivating rice and any crop which is planted three-fourths inch or deeper into the soil, comprising:

a framework;

at least one set of longitudinally spaced elongated bars extending across said framework;

a plurality of resilient elongated downwardly extending substantially linear through their length tine members disposed at uniformly spaced locations along each of said bars capable of vibrating in all directions (360°) while contacting the soil, said tine members being offset in each successive bar in the set from the tine members of any other bar in the set and capable of working substantially 100 percent of the soil surface;

means on each of said bars for securing a straight portion of the tine to the bar; and wheel means engaging said framework for moving said framework in a rolling motion across a surface.

33. An apparatus for cultivating rice and any crop which is planted three-fourths inch or deeper into the soil, comprising:

a framework;

at least one set of longitudinally spaced elongated bars extending across said framework including tine mounting means rotatable about an axis with respect to the framework;

a plurality of resilient elongated downwardly extending substantially linear through their length tine members disposed at uniformly spaced locations along each of said bars being secured thereto by said tine mounting means and being capable of vibrating in all directions (360°) while contacting the soil, said tine members being offset in each successive bar in the set from the tine members of any other bar in the set and capable of working substantially 100 percent of the soil surface;

spring means secured between the framework and the tine mounting means for biasing the tine members carried by the bars; and wheel means engaging said framework for moving said framework in a rolling motion across a surface.

* * * * *